United States Patent [19]

Trygg

[11] Patent Number: 5,018,776
[45] Date of Patent: May 28, 1991

[54] BOTTLE GRIPPING DEVICE

[76] Inventor: Lars E. Trygg, Box 243, S-292 00 Karlshamn, Sweden

[21] Appl. No.: 473,967
[22] PCT Filed: Nov. 18, 1988
[86] PCT No.: PCT/SE88/00630
 § 371 Date: Apr. 18, 1990
 § 102(e) Date: Apr. 18, 1990
[87] PCT Pub. No.: WO89/04794
 PCT Pub. Date: Jun. 1, 1989

[30] Foreign Application Priority Data

Nov. 19, 1987 [SE] Sweden .................. 8704558

[51] Int. Cl.$^5$ .......................... B66C 1/46
[52] U.S. Cl. .................. 294/119.3; 294/87.1
[58] Field of Search ........... 294/87.1, 119.3, 90, 294/98.1, 87.2, 87.26, 87.28, 63.2, 160; 269/22; 279/2 A, 4

[56] References Cited

U.S. PATENT DOCUMENTS

| | | | |
|---|---|---|---|
| 2,308,209 | 1/1943 | Schmutzer et al. | 294/119.3 |
| 3,856,343 | 12/1974 | Muller | 294/119.3 |
| 4,486,045 | 12/1984 | Trygg | 294/119.3 X |

Primary Examiner—Margaret A. Focarino
Assistant Examiner—Dean J. Kramer
Attorney, Agent, or Firm—Sughrue, Mion, Zinn, Macpeak and Seas

[57] ABSTRACT

A gripping device intended particularly for bottles or like objects, including a gripping block (6) which incorporates a plurality of through-passing cylindrical channels (7), and a gripping element arranged in each of the channels. Each gripping element includes a support sleeve (8) having mounted thereon a substantially cylindrical muff (9) made of an elastic material. By delivering pressurized air to the space located between the muff (9) and the support sleeve (8), the muff can be deformed so as to grip around the neck of a bottle. The gripping block (6) is connected in a readily removable manner to a mounting block (5) carried by a holding device (1), and the mounting block is so constructed that when the gripping block is connected to the mounting block the mounting block will hold the gripping elements in place in the gripping block. The arrangement enables the gripping elements to be quickly reached for exchange purposes when removing the gripping block (6) from the mounting block (5).

11 Claims, 2 Drawing Sheets

BOTTLE GRIPPING DEVICE

BACKGROUND OF THE INVENTION

The present invention relates to a gripping device, and more specifically, but not exclusively, to a gripping device intended for gripping bottles or like objects and being of the kind which includes a gripping block in which there is embodied a plurality of through-passing cylindrical channels in each of which there is disposed a gripping element in the form of a support sleeve which has mounted thereon a substantially cylindrical muff made of an elastic material, and air passages which are operative in delivering air under pressure to the space located between the muff and the support sleeve, such as to deform the muff.

Such gripping devices may, for instance, be incorporated in machines for lifting return bottles from crates arriving at a brewery and for placing filled bottles into crates to be distributed from a brewery. Normally, a plurality of bottle-gripping devices, corresponding in number to the number of bottles in a crate, are mutually coupled to form a co-acting unit. In those instances when it is likely that the distances between adjacent rows of bottles in a crate or on the bottle conveyer belt will vary, the grippers may be constructed for mutual displacement in relation to one another, so that the grippers can be brought into their correct position.

Bottle grippers of this known kind, with which respective bottles are gripped with the aid of an elastic muff, preferably a rubber muff disposed in an air passage, afford certain advantages over those bottle grippers with which the bottles are gripped with the aid of balls or like elements urged into engagement with the bottle head.

DE-A1-2 845 094 teaches a bottle gripping device which includes a rubber muff arranged in a through-passing channel for co-action with a bottle head. In this case, however, the rubber muff is mounted between the support sleeve and a screw-threaded plug. Thus, the attachment is achieved solely by the clamping action obtained between the plug and the support sleeve, and has been found unreliable in practice. Among other things, it is difficult in this way to achieve a positive attachment capable of withstanding high pressure impacts.

A more serious drawback with this prior art attachment is that the muff anchorage is progressively impaired, even in normal use of the gripper, and finally results in a gripper which will no longer function in the manner intended. This is due to the fact that when the rubber muff is deformed, creep occurs in the rubber material beyond the position at which the muff is clamped. When the pressure is subsequently equalized, the elasticity of the rubber material is not sufficient to retract the rubber material past the clamping location. Consequently, material migrates progressively beyond said clamping location.

U.S. Pat. No. 4,486,045 teaches a gripping device with which this problem is alleviated, by arranging and configuring the rubber muffs in a manner such that the muffs are self-locking in the channels as a result of the elevated air pressure acting on respective muffs, this elevated pressure also increasing the frictional force between the muff and the channel wall, so that the muff retaining force will increase with increasing pressure.

In order, inter alia, to prevent the sleeve and the muff from being pressed up through the channel when a holder means forming part of the grip arrangement is lowered over a bottle, a screw-threaded plug having a through-passing bore whose diameter is smaller than the diameter of the channel is screwed into the holder means so as to hold the gripping device in position.

Although this known gripping arrangement functions quite satisfactorily in practice, the task of replacing defective rubber muffs is relatively laborious and difficult to carry out, particularly in those instances when the gripping device is so mounted as to leave only a very small space above the gripper elements. This lack of space makes it difficult to unscrew respective plugs so as to enable a defective muff to be removed and replaced with a new muff. It will be understood that it is imperative with machines of this kind that stationary periods can be reduced to a minimum in the event of a malfunction. Furthermore, the construction of the known gripping device is unnecessarily complicated, since it includes a multiplicity of elements or components.

SUMMARY OF THE INVENTION

The main object of the present invention is to provide a gripping device of the general kind described and illustrated in the aforesaid U.S. Patent which has a simpler construction and which, inter alia, enables defective gripping elements or components to be replaced much more readily, and which can be mounted in position essentially in the absence of space above the gripping device.

This object is achieved in accordance with the invention, by replacing the screw-threaded plugs of the earlier known design with a mounting block which carries the whole of the gripping device and from which said device can be readily removed to enable the replacement of one or more individual gripping elements thereof or so that the block can be replaced with an entirely new unit.

In accordance with the present invention, a gripping device of the kind described in the introduction is characterized in that the gripping block is connected to a mounting block suspended in a carrier means in a manner to enable the gripping block to be readily detached from the mounting block; and in that the mounting block is constructed so that when the gripping block is connected to the mounting block said mounting block will hold the gripping elements in place in said gripping block, wherewith the gripping elements are readily accessible for exchange when the gripping block is detached from the mounting block.

Thus, in the case of the present inventive gripping device all gripping elements incorporated in said device are accessible simultaneously for replacement when the gripping block is detached from the mounting block. This enables defective gripping elements to be replaced rapidly with the minimum of stationary time. Optionally, the gripping block can be replaced immediately with another block in which all gripping elements are functionable, whereafter the defective gripping elements in the removed gripping block can be replaced once the conveyer belt has been restarted.

The mounting block will preferably incorporate a number of through-passing channels corresponding to the number of channels in the gripping block, although the channels in the mounting block will have a smaller diameter than the channels in the gripping block, such that the gripping elements will be held automatically in place.

In accordance with one preferred embodiment of the invention, the gripping block and the mounting block are provided with co-acting means which enable the gripping block to be displaced laterally in relation to the mounting block and to be detached completely therefrom. These co-acting means may suitably have the form of at least one groove in the one block and at least one promontory of corresponding profile on the other block.

Preferably, the mounting block will also be provided with means for receiving at least one air delivery conduit, and the connecting means of this conduit will extend through the mounting block, so as to deliver air to an air distributing channel provided in the gripping block and, in conjunction therewith, to fixate and lock the gripping block in a correct position relative to the mounting block. Preferably, the aforesaid connecting means will be screwed into the mounting block, so that said means can be unscrewed out of engagement with the gripping block in order to release said block while said means is still held firmly in the mounting block. This further facilitates the replacement of deffective gripping elements. In this respect, the aforesaid connecting means will conveniently include a nipple which projects down into the channel of the gripping block and which is sealed against the channel wall by means of an O-ring encircling the nipple.

In the case of one preferred embodiment the gripping block and the mounting block each include at least one row of mutually opposite channels, wherewith a co-acting pair of guide grooves and promontories co-acting therewith extend along said row.

BRIEF DESCRIPTION OF THE PREFERRED EMBODIMENTS

The invention will now be described in more detail with reference to the accompanying drawings.

Figure 1:
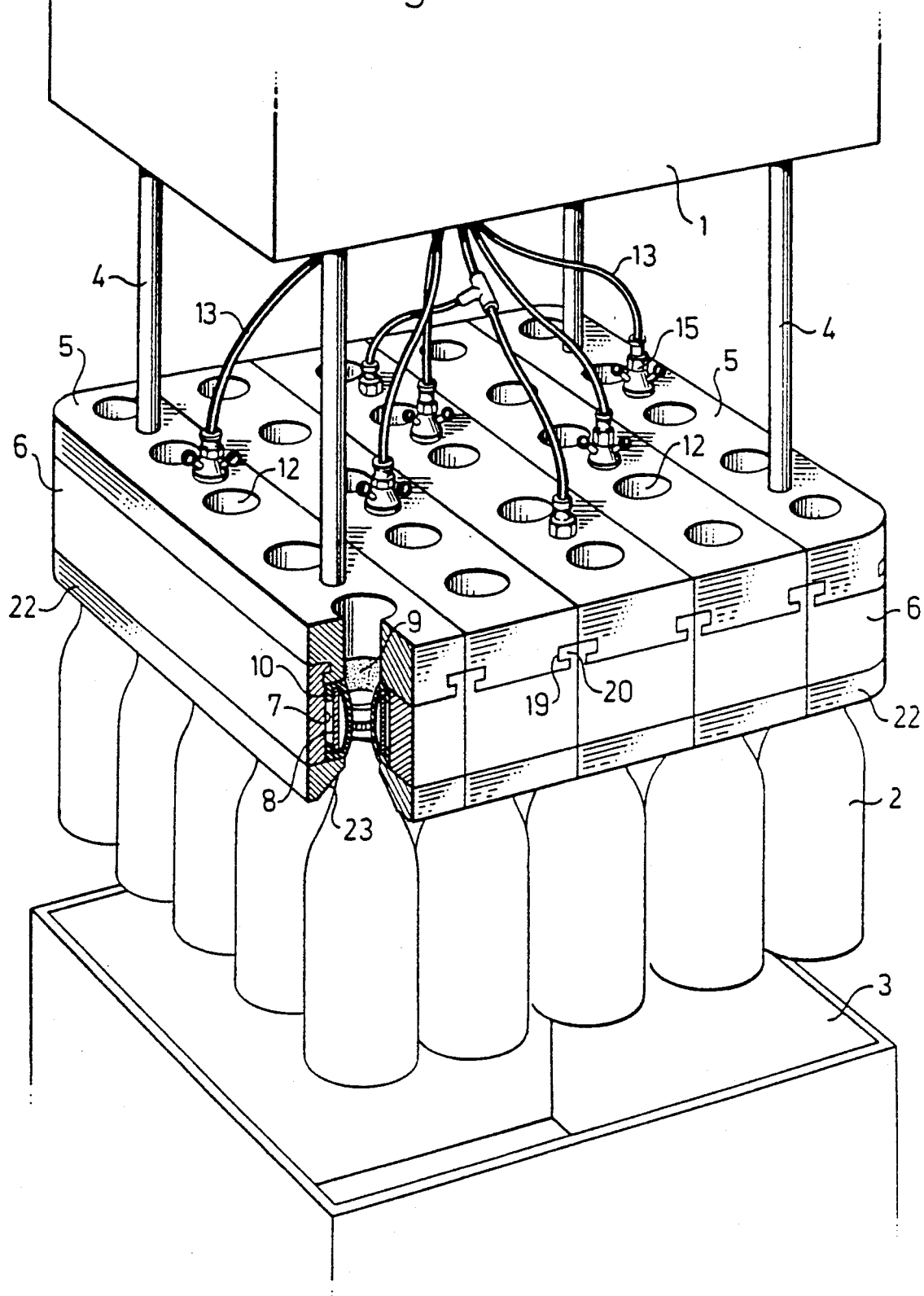
FIG. 1 is a perspective view of part of a bottle handling machine provided with a gripping device according to the invention.

Illustrated in FIG. 1 is a holding device 1 (not shown in detail) which is intended for holding bottle-gripping devices constructed in accordance with the invention. The holding device can be raised and lowered and moved laterally in order to enable bottles 2 to be lifted from a crate 3 and placed on a conveyer belt (not shown), and to enable bottles to be lifted from the conveyer belt and placed in a crate. The holding device 1 may be of known construction and has not therefore been shown in detail. The holding device carries, via tubular uprights 4, a plurality of mounting blocks 5 which are arranged in side-by-side relationship and each of which is connected in a readily detachable manner to an associated gripping block 6.

Figure 3:
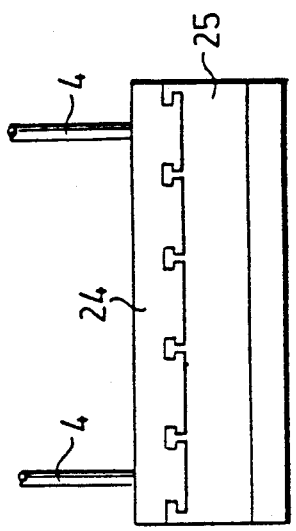
FIG. 3 is a part sectional view of a row of gripping elements incorporated in a gripping device according to FIG. 1.
Figure 2:
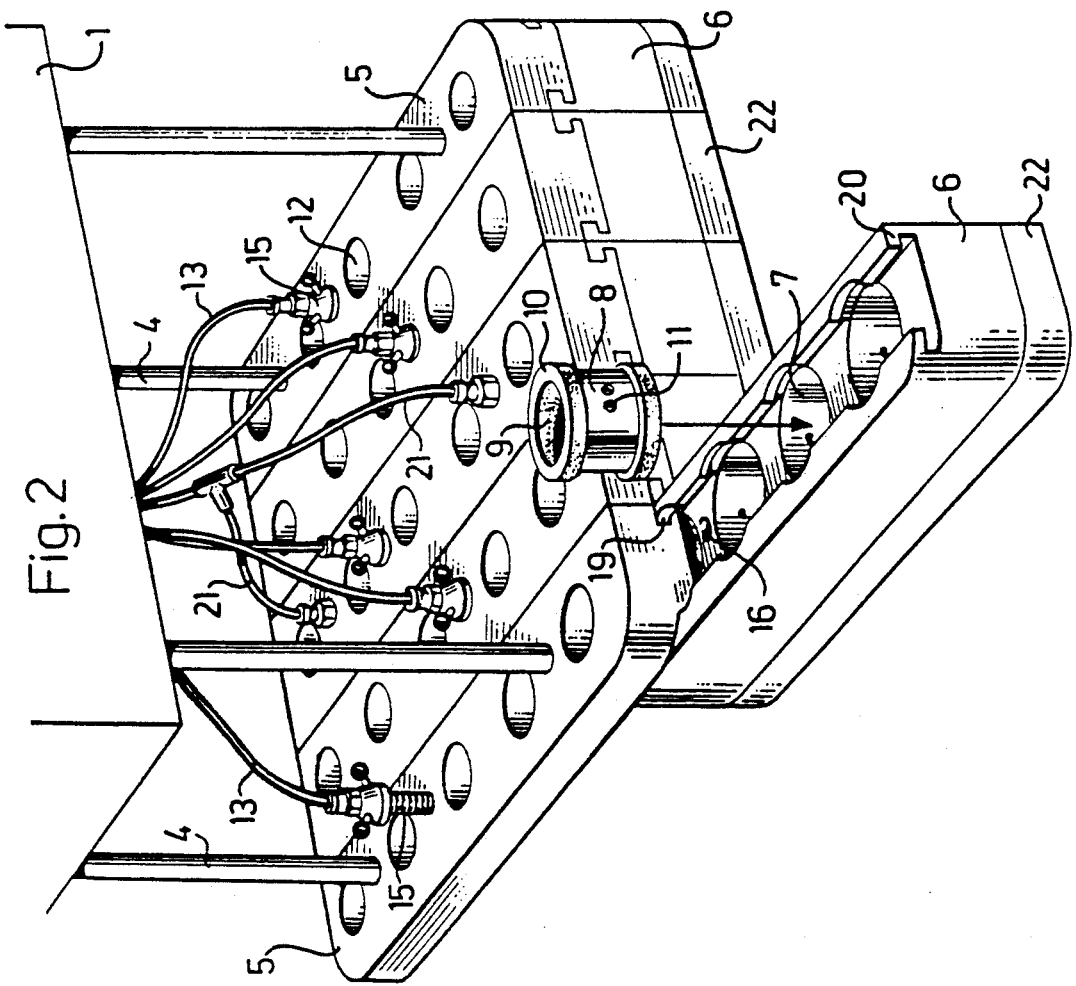
FIG. 2 is a schematic illustration of how a gripping element can be changed in a gripping device according to FIG. 1.

In the case of the illustrated embodiment, see also FIGS. 2 and 3, each gripping block 6 incorporates five through-passing channels 7. Accommodated in each channel 7 is a gripping element intended for co-action with a bottle neck and being of the kind described in the aforesaid U.S. Patent. Thus, each of the gripping elements includes a support sleeve 8 which carries a rubber muff 9 having flanges 10 which engage over both end edges of the sleeve. The flanges 10 are a close fit in the channels 7 and have an oblique activating surface which, when pressurized air is delivered to the space between respective channel walls and sleeves, causes the abutment pressure of the muff flanges 10 with the channel wall to increase with increasing air pressure. The gripping elements will therefore be self-locking in respective channels during a gripping operation.

To enable a bottle to be gripped, the sleeve 8 is provided with one or more holes 11 which ensure that pressurized air is also delivered to the space located between respective sleeves 8 and rubber muffs 9, so as to deform and press the muff around the head of a bottle 2 located in said muff. The design of said gripping elements and their modus operandi are described in detail in the aforesaid U.S. Patent and need not therefore be described in further detail.

Since the gripping devices are self-locking in respect to channel 7, the arrangement need only include means for holding the gripping devices in place when said devices are moved down over a respective bottle. In the case of the illustrated embodiment, these means consist of the mounting block 5 associated with each gripping block 6, the mounting block 5 of this embodiment being provided with five through-passing channels 12 arranged opposite the channels 7 in the gripping block 6. The channels 12, the purpose of which is to prevent blocking of respective grippers as a result of loose bottle caps or other debris, have a smaller diameter than the channels 7. Thus, these channels 12 will prevent the gripping elements from being pushed up out of the channels 7. The mounting block 5, however, need not exert a downward pressing force on the gripping elements and the muff flanges 10. If the risk of loose bottle caps or the like is non-existent, the mounting block need not be provided with channels.

Each gripping block 5 is provided with means for receiving an air hose 13 or like conduit for delivering air to the gripping block. This means may comprise a screw-threaded hole 14 intended for cooperation with an air nipple 15 pivotally mounted on the hose 13. The air nipple 15 extends completely through each mounting block 5 and down into an air passageway 16 in the form of a bore provided in the underlying gripping block 6. That part of the air nipple 15 which projects down into the bore 16 is provided with an O-seal 17. The bore 16 communicates with all gripping elements in a gripping block 16 via transverse channels 18, see FIG. 3.

In accordance with the invention, the gripping block 6 shall be capable of ready detachment from respective mounting blocks 5. In the case of the illustrated embodiment, the gripping block 6 can be displaced linearly in relation to the mounting blocks 5, as illustrated in FIG. 2, respective mounting blocks 5 being provided with horizontal grooves or tracks 19 and the gripping block 6 being provided with a correspondingly profiled promontory 20. This construction is highly beneficial, inter alia, when replacing worn muffs. A rubber muff 9 may be made defective, for instance, when a broken bottle or some other sharp object is moved into the gripping device, or may become worn during its normal period of use.

When replacing a defective muff 9, the air nipple 15 is unscrewed from its associated mounting block 5 to an extent at which the bottom of the nipple passes free from the gripping block 6, see FIG. 2. The gripping block can then be easily slid laterally from the mounting block and the defective gripping element replaced with a new element. This can be effected very quickly, since the defective gripping element need only be lifted from its associated channel and a new gripping element inserted thereinto. If the space available is very confined, the gripping block 6 can be taken away and the gripping element replaced somewhere else. In this respect, the stationary time can be reduced to a minimum by replacing the withdrawn gripping block immediately with another gripping block incorporating complete serviceable gripping elements. The air nipple 15 is then screwed down, so that the O-seal will seal against the bore 16. The air nipple therewith also assists in locking the gripping block 6 firmly in its precise correct position relative to the mounting block 5. The air pressure hose can thereafter be reconnected, wherewith the arrangement is again ready for operation. This exchange need only take some tens of seconds, which is highly beneficial.

In order to enable the arrangement to be adjusted between varying bottle distances, the mounting blocks 5 with gripping blocks 6 may be arranged for lateral movement in relation to one another, for example with the aid of pneumatic piston-cylinder devices to which air is supplied through air lines 21, in the manner described in more detail in the aforesaid U.S. Patent.

Both the mounting blocks 5 and the gripping blocks 6 are preferably made of a plastics material. The lower part 22 of respective gripping blocks is provided with conically shaped guide openings 23 which are effective in guiding the bottles to the vicinity of respective channels 7, see FIG. 3, and is also preferably made of a plastics material which has a higher wear strength than that required in the remaining part of the gripping block 6.

As will be understood, the T-shaped groove 19 in the mounting block 5 can be replaced with a fishtail shaped groove or grooves of some other cross-section. The gripping block may also be mounted on the mounting block in a manner different to that shown, for instance vertical displacement and locking of the blocks can be effected with the aid of balls or some other form of quick-coupling means.

Figure 4:
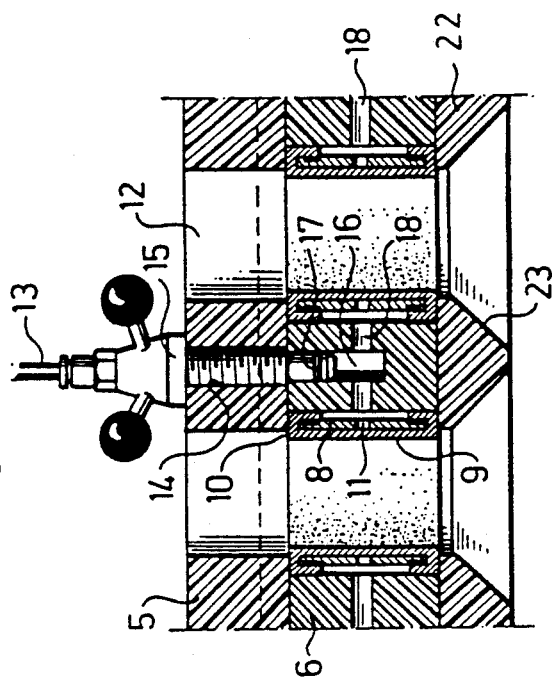
FIG. 4 is a schematic side view of another embodiment of a gripping device constructed in accordance with the invention.

FIG. 4 illustrates schematically an alternative embodiment of a gripping device according to the invention which is intended for use when the distance between the bottles does not change, i.e. said bottles have a fixed spacing relationship. This alternative embodiment includes a single, flat mounting block 24 and a flat gripping block 25 displaceably carried by the block 24. When the block 25 is withdrawn, all gripping elements are therewith exposed. This alternative arrangement requires only one or a few air connections.

The aforedescribed embodiments are only to be considered as preferred examples of the invention, and it will be understood that these embodiments can be modified in several respects within the scope of the claims, inter alia with respect to the manner and direction in which mounting blocks and gripping blocks can be displaced relative to one another and to their size. The means for locking the blocks together can also be varied as required, although the use of an air nipple to this end is highly advantageous. Furthermore, the arrangement can be used for gripping other objects than bottles, in which case the configuration of the gripping elements will be adapted in accordance with the application concerned.

I claim:

1. A gripping device, particularly intended for bottles or like objects, comprising:
   (a) a holding device (1),
   (b) a mounting block (5) carried by the holding device,
   (c) at least one gripping block (6) defining a plurality of through-passing cylindrical channels (7),
   (d) a plurality of gripping elements individually disposed in the channels, each gripping element comprising a support sleeve (8), and a substantially cylindrical muff (9) of elastic material mounted on the sleeve, the gripping elements being inserted in the channels from an upwardly facing surface of the gripping block,
   (e) air passage means (18) defined in the gripping block for supplying pressurized air to a space located between each muff and an associated support sleeve to deform each muff, and
   (f) non-threaded means for readily detachably mounting the gripping block to the mounting block with said upwardly facing surface of the gripping block disposed closely proximate a downwardly facing surface of the mounting block such that the mounting block securely retains the gripping elements in their respective channels in the gripping block, and such that the gripping block is readily and easily removable from the mounting block to enable access to and replacement of worn or damaged gripping elements.

2. A gripping device according to claim 1, wherein the mounting block (5) is provided with through-passing channels (12) which correspond to the channels (7) in the gripping block (6) and which, for the purpose of holding the gripping elements in place, have a smaller diameter than the channels (7) in the gripping block (6).

3. A gripping device according to claims 1 or 2, wherein the mounting block (5) is provided with means (14) for receiving at least one air line (13) through which air is delivered to the gripping block (6).

4. A gripping device according to claim 3, wherein connecting means (15) of the air line (13) extend through the mounting block (5) and discharge into an air distributing passage (16) in the gripping block (6).

5. A gripping device according to claim 1, wherein the non-threaded mounting means comprises mutually co-acting means (19, 20) which enable the gripping block to be displaced laterally in relation to the mounting block so as to enable one block to be removed completely from the other.

6. A gripping device according to claim 5, wherein said mutually co-acting means comprise at least one groove or track (19) in the one of the mounting and holding blocks and at least one co-acting profile (20) in another of the blocks.

7. A gripping device according to claim 6, wherein the gripping block (6) and the mounting block (5) each include at least one row of mutually opposing channels (7); and one co-acting pair of guide grooves (19) and profiles (20) extend along said row.

8. A gripping device according to claims 5, 6 or 7, wherein the mounting block (5) is connected to at least one air delivery line (13); and connecting means (15) of said air delivery line extend through the mounting block (5) so as to deliver air to an air distributing passage (16) in the gripping block (6) while simultaneously fixing and firmly locking said gripping block in a correct position relative to the mounting block.

9. A gripping device according to claim 8, wherein said connecting means (15) is screwed into the mounting block (5) so as to enable said connecting means to be unscrewed out of engagement with the gripping block (6) to release said gripping block while said connecting means is constantly held in the mounting block (5).

10. A gripping device according to claim 9, wherein said connecting means includes a nipple which extends down into the air passage (16) in the gripping block (6) which is sealed against a wall of the passage by an O-seal (17) encircling the nipple.

11. A gripping device according to claim 1, wherein there are a plurality of gripping blocks disposed side by side in a horizontal array, each gripping block being individually detachably mounted to the mounting block.

* * * * *